(12) United States Patent
Huang et al.

(10) Patent No.: US 8,369,712 B2
(45) Date of Patent: Feb. 5, 2013

(54) DISPERSION COMPENSATION CIRCUITRY AND SYSTEM FOR ANALOG VIDEO TRANSMISSION WITH DIRECT MODULATED LASER

(75) Inventors: Wei Huang, San Jose, CA (US); Thomas C. Lam, San Jose, CA (US); Li-Ping Chen, San Jose, CA (US)

(73) Assignee: Harmonic Inc., San Jose, CA (US)

( * ) Notice: Subject to any disclaimer, the term of this patent is extended or adjusted under 35 U.S.C. 154(b) by 33 days.

(21) Appl. No.: 13/070,359

(22) Filed: Mar. 23, 2011

(65) Prior Publication Data

US 2011/0210777 A1    Sep. 1, 2011

Related U.S. Application Data

(62) Division of application No. 12/124,044, filed on May 20, 2008, now Pat. No. 7,945,172.

(51) Int. Cl.
*H04B 10/00* (2006.01)
(52) U.S. Cl. ............ 398/193; 398/194; 398/192; 372/33
(58) Field of Classification Search .......... 398/158–161, 398/192–194; 372/33
See application file for complete search history.

(56) References Cited

U.S. PATENT DOCUMENTS

| | | | | |
|---|---|---|---|---|
| 4,258,340 A * | 3/1981 | Ryu | ................. | 333/18 |
| 4,581,595 A | 4/1986 | Silagi | | |
| 4,654,891 A * | 3/1987 | Smith | ................. | 398/193 |
| 4,868,575 A * | 9/1989 | Mok et al. | ................. | 342/373 |
| 4,943,783 A * | 7/1990 | Nojima | ................. | 330/149 |
| 4,992,754 A * | 2/1991 | Blauvelt et al. | ................. | 330/149 |
| 5,210,633 A * | 5/1993 | Trisno | ................. | 398/193 |
| 5,252,930 A * | 10/1993 | Blauvelt | ................. | 330/149 |
| 5,321,710 A * | 6/1994 | Cornish et al. | ................. | 372/26 |
| 5,361,156 A * | 11/1994 | Pidgeon | ................. | 398/193 |
| 5,365,187 A | 11/1994 | Hornak et al. | | |
| 5,418,637 A * | 5/1995 | Kuo | ................. | 398/159 |
| 5,424,680 A * | 6/1995 | Nazarathy et al. | ................. | 330/149 |
| 5,430,569 A | 7/1995 | Blauvelt et al. | | |
| 5,436,749 A * | 7/1995 | Pidgeon, Jr. et al. | ................. | 398/193 |
| 5,453,868 A * | 9/1995 | Blauvelt et al. | ................. | 398/199 |
| 5,477,367 A * | 12/1995 | van der Heijden | ................. | 398/193 |
| 5,481,389 A * | 1/1996 | Pidgeon et al. | ................. | 398/208 |
| 5,526,159 A * | 6/1996 | Gottwald | ................. | 398/159 |
| 5,600,472 A * | 2/1997 | Uesaka | ................. | 398/158 |
| 5,796,307 A * | 8/1998 | Kumagai et al. | ................. | 330/149 |

(Continued)

FOREIGN PATENT DOCUMENTS

| | | |
|---|---|---|
| EP | 0475376 A2 | 3/1992 |
| EP | 0524758 A2 | 1/1993 |

(Continued)

OTHER PUBLICATIONS

Kuo et al. in "Second-Order Dispersion and Electronic Compensation in Analog Links Containing Fiber Amplifiers" (Journal of Lightwave Technology, vol. 10, No. 11, Nov. 1992).

(Continued)

*Primary Examiner* — Agustin Bello
(74) *Attorney, Agent, or Firm* — Warren S. Wolfeld; Haynes Beffel & Wolfeld, LLP

(57) ABSTRACT

An improved precompensation circuit includes a greatly improved differentiator in the dispersion precompensation path, a preprocessor in the dispersion precompensation path for reducing f2-f1 type Composite Second Order (CSO) distortion, and a broadband phase shifter for compensating undesired vector interaction between the laser predistortion and dispersion compensation.

6 Claims, 14 Drawing Sheets

U.S. PATENT DOCUMENTS

| | | | |
|---|---|---|---|
| 5,798,854 A * | 8/1998 | Blauvelt et al. | 398/194 |
| 6,031,432 A * | 2/2000 | Schreuders | 333/24 R |
| 6,055,278 A * | 4/2000 | Ho et al. | 375/296 |
| 6,061,161 A * | 5/2000 | Yang et al. | 398/194 |
| 6,104,241 A * | 8/2000 | Cova et al. | 330/149 |
| 6,122,085 A * | 9/2000 | Bitler | 398/193 |
| 6,133,790 A * | 10/2000 | Zhou | 330/149 |
| 6,194,942 B1 * | 2/2001 | Yu et al. | 327/317 |
| 6,204,718 B1 * | 3/2001 | Pidgeon, Jr. | 327/318 |
| 6,212,315 B1 * | 4/2001 | Doerr | 385/31 |
| 6,288,814 B1 * | 9/2001 | Blauvelt | 398/193 |
| 6,580,534 B2 * | 6/2003 | Madsen | 398/63 |
| 6,741,128 B2 * | 5/2004 | Okubo et al. | 330/149 |
| 6,907,156 B1 * | 6/2005 | Madsen | 385/24 |
| 6,917,764 B1 * | 7/2005 | Wilson | 398/193 |
| 6,925,212 B2 * | 8/2005 | Price | 385/2 |
| 6,985,020 B2 * | 1/2006 | Zhou | 327/317 |
| 7,016,615 B1 * | 3/2006 | Lenz et al. | 398/193 |
| 7,266,159 B2 * | 9/2007 | Vella-Coleiro | 375/296 |
| 7,496,253 B2 * | 2/2009 | Chang et al. | 385/24 |
| 7,606,502 B2 * | 10/2009 | Zhou | 398/193 |
| 7,634,198 B2 * | 12/2009 | Peral | 398/159 |
| 7,872,528 B2 * | 1/2011 | Bockelman et al. | 330/149 |
| 7,945,172 B2 * | 5/2011 | Huang et al. | 398/193 |
| 8,064,769 B2 * | 11/2011 | Galli et al. | 398/85 |
| 2004/0264596 A1 | 12/2004 | Vella-Coleiro | |
| 2005/0271396 A1 | 12/2005 | Iannelli | |
| 2009/0196629 A1 * | 8/2009 | Zheng et al. | 398/193 |
| 2009/0196630 A1 * | 8/2009 | Ishaug et al. | 398/193 |
| 2009/0245309 A1 * | 10/2009 | Khalouf et al. | 372/38.02 |
| 2009/0290880 A1 * | 11/2009 | Huang et al. | 398/115 |
| 2012/0027418 A1 * | 2/2012 | Secondini et al. | 398/158 |

FOREIGN PATENT DOCUMENTS

| | | |
|---|---|---|
| WO | 9409574 A1 | 4/1994 |
| WO | 9515613 A1 | 6/1995 |

OTHER PUBLICATIONS

"Electrical Predistortion to Compensate for Combined Effect Chirp of Laser and Fiber Dispersion", Gysel, Electronics Letters, vol. 27, No. 5, Feb. 28, 1991, pp. 421-423.

The Art of Electronics, 2nd Edition, Paul Horowitz, Winfield Hill, Cambridge University Press, 1989.

Electronic Filter Design Handbook LC, Active and Digital Filters, 2nd Edition, Arthur B. Williams, Fred J. Taylor, McGrow Hill 1988.

May 14, 2012 EP Search Report from HRMN 1003-2, 12 pp.

* cited by examiner

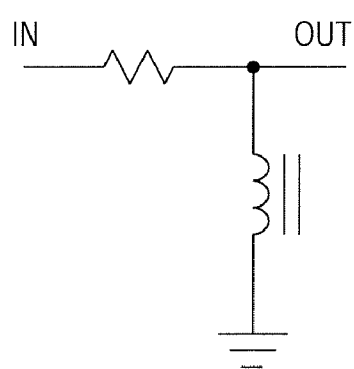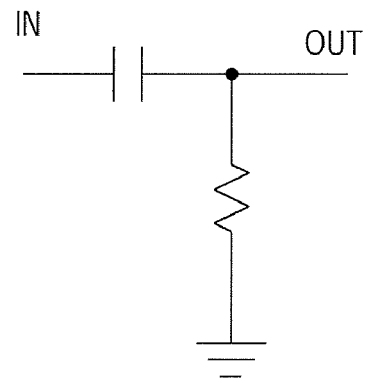
FIG. 4
(PRIOR ART)
FIG. 5
(PRIOR ART)

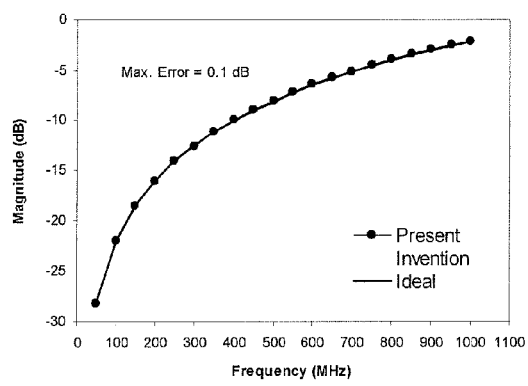
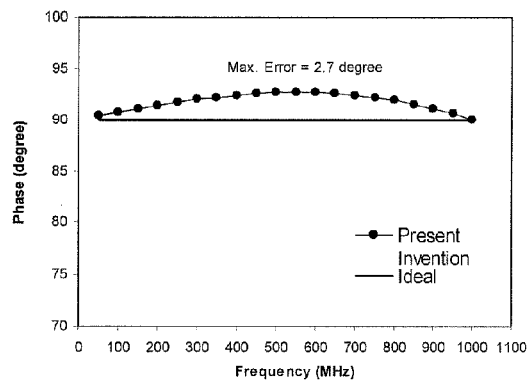
FIG. 10(a)
FIG. 10(b)

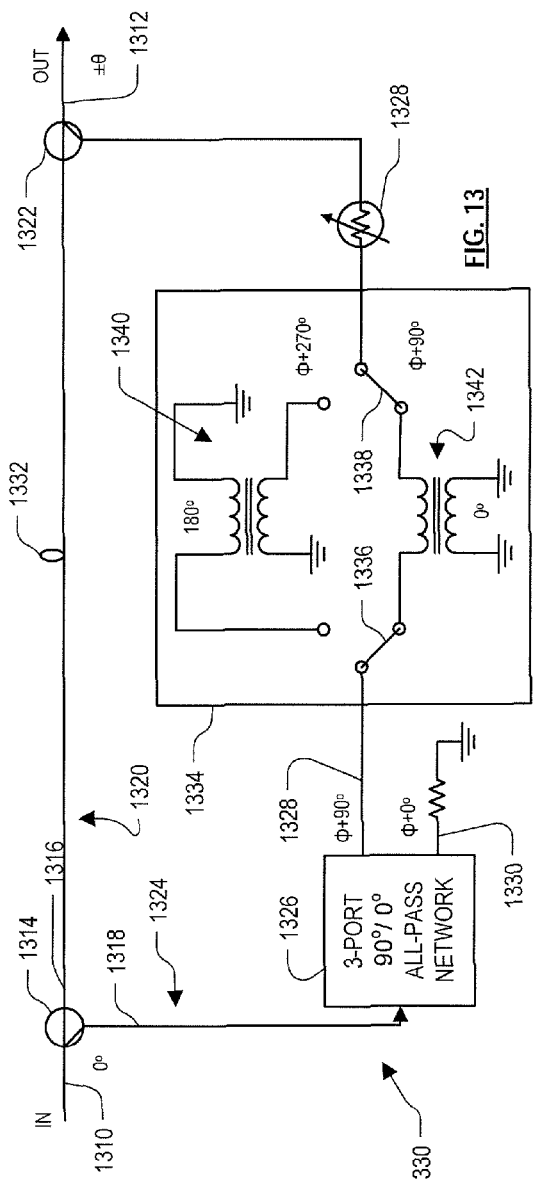
FIG. 13
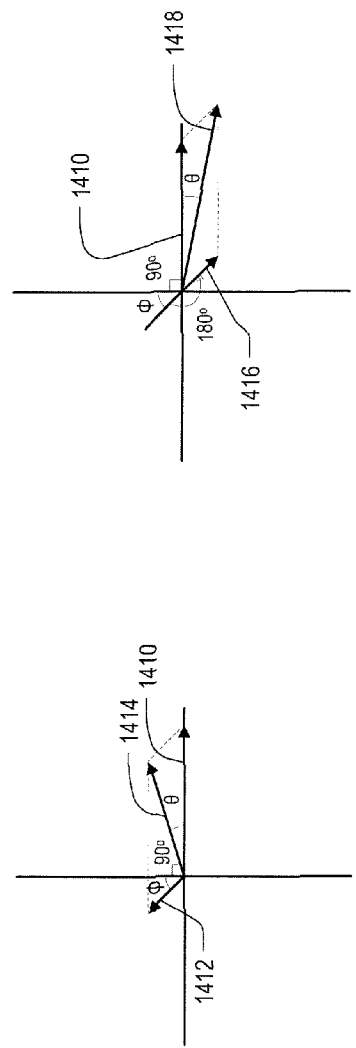
FIG. 14(a)
FIG. 14(b)

DISPERSION COMPENSATION CIRCUITRY AND SYSTEM FOR ANALOG VIDEO TRANSMISSION WITH DIRECT MODULATED LASER

RELATED APPLICATION

This application is a divisional of co-pending U.S. application Ser. No. 12/124,044 filed 20 May 2008.

BACKGROUND

The present invention relates to electrical compensation for fiber dispersion and laser-induced distortion in analog optical systems.

Analog video signals are often transmitted via Hybrid Fiber Coax (HFC) networks using Dense Wavelength Division Multiplexing (DWDM), in which each channel is amplitude modulated onto a separate subcarrier with the combined RF signal modulating the laser source. The subcarriers are narrowly spaced, for example by 6 MHz each in the NTSC channel plan. (As used herein, a "subcarrier" is a type of "carrier", so that either term may be used herein to refer to the subcarrier.)

Direct modulated DFB lasers (DML) have been widely used in HFC networks. In forward application 1310 nm single wavelength DML is the predominate technology due to its ability to carry the full bandwidth of signals to meet required system performance. Recently, channel loading for HFC networks has expanded from 50-870 MHz to 50-1000 MHz. 1550 nm DML on the other hand, is used for DWDM (Dense Wavelength Division Multiplexing) in conjunction with 1550 nm externally modulated transmitters for narrowcasting applications. Direct modulated optical laser sources introduce a modulation-dependent frequency deviation of the laser output known as laser chirp. Coupled with fiber dispersion, chirp can produce unwanted artifacts that degrade system performance. For both 1310 nm DML and 1550 nm externally modulated transmitters, the dispersion has not been a problem due to the absence of dispersion in optical fiber at 1310 nm and absence of chirp in externally modulated transmitters. 1550 nm DML transmitter for narrowcasting on the other hand does have a chirp induced dispersion problem, but it is not so severe as to substantially degrade system performance because the number of channel transmitted is very small (between 50 and 300 MHz).

With a changing business environment that now demands both wide bandwidth and low cost for expand HFC networks, and with advances in DFB laser technology, DML based transmitters are becoming a better choice than externally modulated transmitter for DWDM applications due to their significantly lower cost and simplicity. It is therefore becoming essential to overcome dispersion degradation for the technology to work well enough to meet system requirements. This is true for both 1310 nm and 1550 nm DWDM transmitters.

It is well known to mitigate the effects of both laser chirp and chromatic distortion by precompensating the RF modulation signal before it is applied to the transmitter. The basic concept is that a set of distortion signals are produced in advance by a distortion generator circuit, which are equal in magnitude but opposite in phase to the characteristics of the nonlinearity to be compensated. When these predistortion signals interact with distortion generated by the system non-linearities they cancel each other out, thereby reducing or removing the distortion that would otherwise be generated.

The distortion caused by both laser chirp and dispersion in the fiber is so-called second order distortion. Laser chirp distortion has a frequency independent term and a frequency dependent term, whereas the distortion introduced by dispersion in the fiber has only a frequency independent term, the frequency independent term being negligible. The frequency dependent term caused by laser chirp distortion also includes a 90° phase shift. Another source of distortion, that introduced by the fiber amplifier (if present), also has only a frequency independent term. A multi-path predistortion scheme for analog optical transmission distortion compensation based on these observations is described in Kuo et al. in "Second-Order Dispersion and Electronic Compensation In Analog Links Containing Fiber Amplifiers," Journal of Lightwave Technology, Vol. 10, No. 11, pp. 1751-1759 (1992), incorporated by reference herein. Kuo's scheme collects all the frequency independent terms separately from the frequency dependent terms, precompensates them separately, and recombines them with the original RF signal to yield a signal that precompensates for all three sources of distortion.

FIG. 1 is a block diagram illustrating this scheme. As shown in FIG. 1, the scheme involves branching the input RF signal into three parallel paths and then recombining them for delivery to the laser driver. One path 112 introduces frequency dependent precompensation, and a second path 114 introduces frequency independent precompensation. The third path 116 carries the original signal, delayed to match the delay in the paths 112 and 114.

Referring to FIG. 1, the input RF signal is provided to a splitter 110 having three outputs defining the three respective parallel paths. In the frequency dependent compensation path 112, the RF signal is first squared in squarer 118. The squared signal is then passed through a variable attenuator 120 and then an amplifier 122, and then differentiated in a differentiator 124. The differentiator is provided to effect both the frequency dependence and the 90° phase shift. In the frequency independent compensation path 114, the RF signal is squared in squarer 126, then attenuated in variable attenuator 128. No frequency dependence or phase shift is included. In the third path 116, the RF signal is merely delayed in physical delay element 130 in order to match the delay in the other two paths. The outputs of the three paths are recombined in combiner 132 for delivery to the laser source. Similar schemes are disclosed in Pidgeon U.S. Pat. No. 5,481,389 and Gottwald U.S. Pat. No. 5,526,159, both incorporated by reference herein.

Unfortunately, all three proposals have severe limitations for broadband applications that carry the full channel loading from 50 to 1000 MHz. Precompensation using the known schemes for laser chirp and fiber dispersion typically will not meet tight specifications for full wideband channel loading using direct modulated laser sources operating either at 1310 nm or 1550 nm.

Higher performance allows the system to reach longer distances. Therefore, to make high performance DWDM DML transmitters, better distortion cancellation is required and high performance circuitry is required to achieve high performance. The invention described herein addresses these problems.

SUMMARY

Applicants have recognized several reasons why the conventional multipath predistortion scheme is inadequate, and various aspects of the invention address these issues. In particular, among other aspects and roughly described, an improved precompensation circuit includes a greatly improved differentiator in the dispersion precompensation path, a preprocessor in the dispersion precompensation path for reducing f2−f1 type Composite Second Order (CSO) distortion, and a broadband phase shifter for compensating undesired vector interaction between the laser predistortion and dispersion compensation.

Particular aspects of the present invention are described in the claims, specification and drawings.

BRIEF DESCRIPTION OF THE DRAWINGS

The invention will be described with reference to the drawings, in which:

FIGS. 4 and 5 are schematic diagrams of conventional differentiator circuits.

FIGS. 10(a) and 10(b) are magnitude and phase responses, respectively, of the network of FIG. 9(a) as compared to the ideal.

FIG. 13 is a schematic diagram of a broadband phase shifter according to features of the invention.

FIGS. 14(a) and 14(b) are vector diagrams illustrating the operation of embodiments of FIG. 13.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 2:
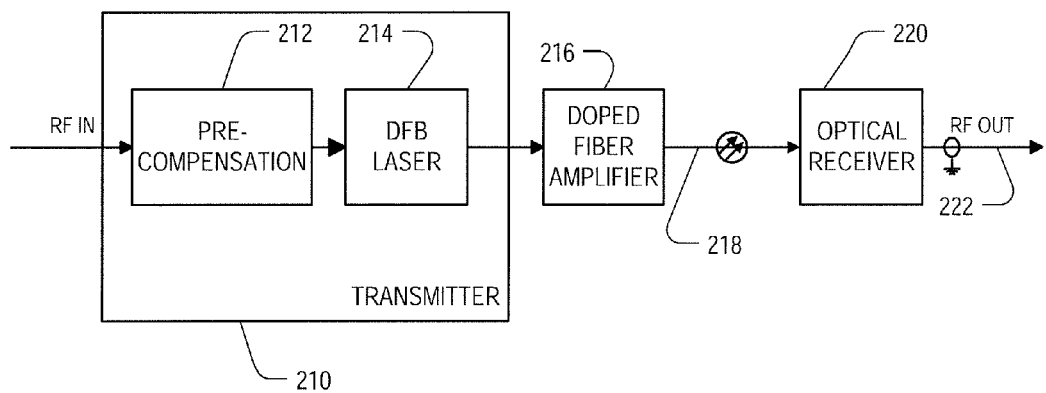
FIG. 2 is a block diagram of a portion of an HFC distribution system.

FIG. 2 is a block diagram of a portion of an HFC distribution system. An input RF signal compositing multiple channels is provided to a transmitter 210. The transmitter is designed to support a predetermined range of input frequencies. Preferably, but not necessarily, the transmitter is designed to support a wideband input RF signal compositing analog signals modulated onto video subcarriers ranging in frequency from 50 MHz through 1000 MHz. Inside the transmitter, the input RF signal is provided to a precompensation unit 212, the output of which is direct modulated onto a DFB laser source 214. The optical output of the DFB laser 214 is amplified in a doped fiber amplifier 216 (omitted in 1310 nm systems), the output of which is provided to transmission fiber 218. Transmission fiber 218 spans a number of kilometers, and is then provided to an optical receiver 220. The optical receiver 220 detects the RF signal received from the fiber 218 and drives it onto a coaxial cable span 222 for delivery to a destination (not shown).

Figure 3:
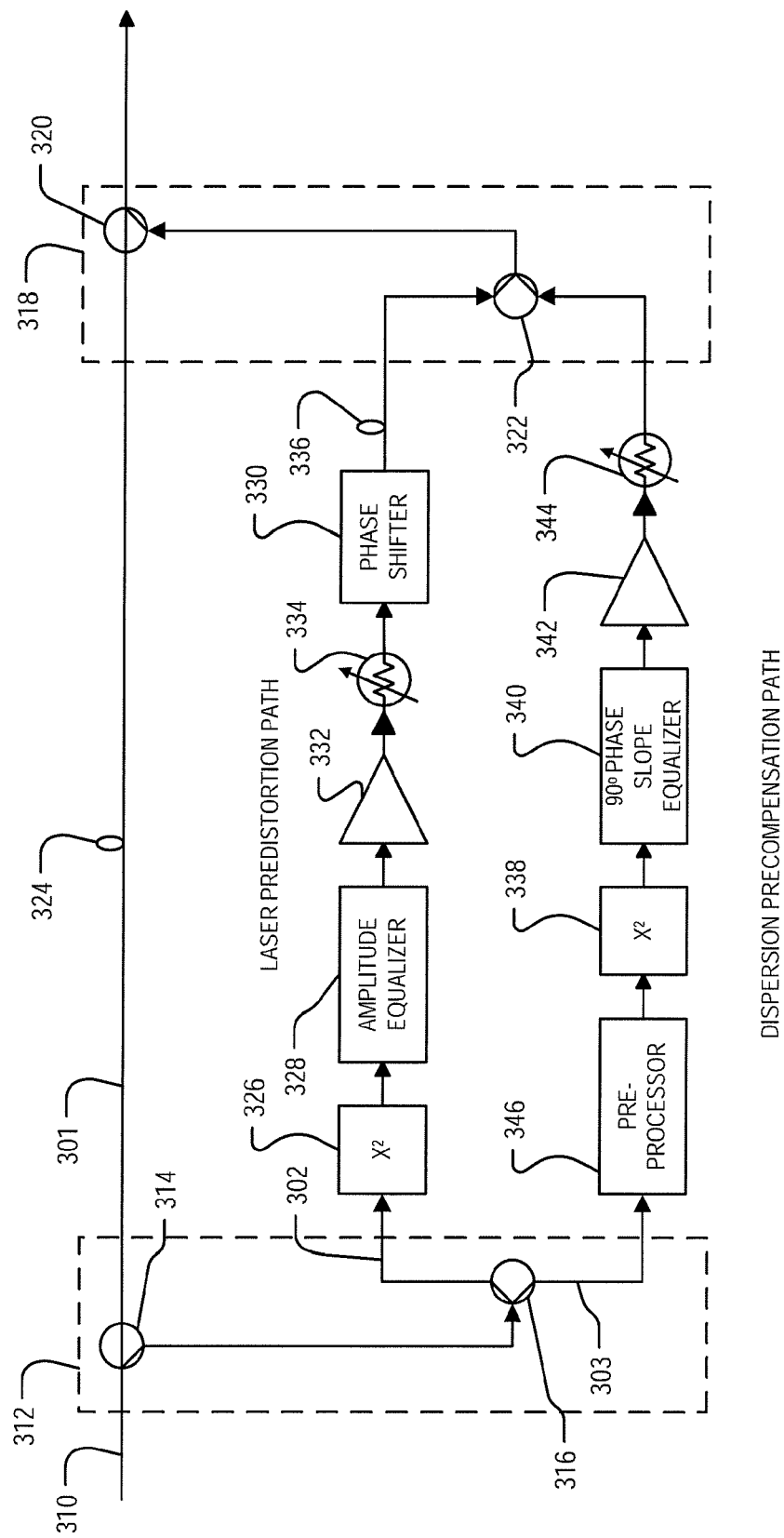
FIG. 3 is a block diagram of a precompensation circuit according to features of the invention.

FIG. 3 is a block diagram of the precompensation unit 212 (FIG. 2). It has an input node 310 connected to an input port of a signal splitter 312, which splits the input RF signal into three signal paths or branches 301, 302 and 303. As used herein, the terms branch and signal path are used interchangeably. The splitter 312 can be unitary in design, but preferably it outputs most of the power from the original signal onto the first signal branch 301, and the power output onto the second and third branches 302 and 303 can be equal or nearly equal to each other. In the embodiment of FIG. 3, the splitter 312 includes a directional coupler 314 acting as a tap device. The main output of the coupler 314 is connected to the upstream end of the first signal path 301, and the tapping port of the coupler 314 is connected to the input of a 3 dB splitter 316. The 3 dB splitter has two outputs, one of which drives the second signal path 302 and the other of which drives the third signal path 303. Note that in another embodiment, the signal splitter 312 could include outputs for additional branches to introduce precompensation for other distortions not addressed herein.

The downstream end of the first signal path 301 is connected to one input port of a three-input signal combiner 318. The first signal path 301 includes a delay element 324, which can be for example a length of coaxial cable, in order to match the signal delays in the second and third signal paths 302 and 303. As with the splitter 312, the combiner 318 can be unitary in design, but in the embodiment of FIG. 3 it includes a directional coupler 320 having a first input port connected to the downstream end of the first signal path 301, and a second input port connected to the output of another combiner 322. The directional coupler 322 has first and second inputs connected to the downstream ends of respectively the second and third signal paths 302 and 303.

The second signal path 302 precompensates for second order laser chirp distortion. Accordingly, it includes a second order distortion generator 326, which is preferably a signal squaring component (a "squarer"). Downstream of the squarer 326 is an amplitude equalizer 328 to compensate for magnitude errors introduced by both the splitter 312 and combiner 318; a broadband phase shifter 330 to compensate for phase errors introduced by the amplitude equalizer and other components; and an amplifier 332 and variable attenuator 334. The second signal path 302 may also include a delay element 336 similar to delay element 324, to match the signal delays in the third signal path 303. The delay element 336 can be located in the third signal path 303 instead, if appropriate. It will be observed that all the components in the second signal path 302 which are downstream of the squarer 326 are linear (the amplifier 332 might not be exactly linear, but its nonlinearity is negligible for present purposes). As long as signal integrity is maintained, therefore, they can be connected in any sequence in various embodiments, not only the sequence shown in the drawing.

The third signal path 303 precompensates for fiber dispersion, which is primarily frequency dependent second order distortion. Accordingly, it includes another second order distortion generator 338, which again is preferably a signal squaring component (a "squarer"). Downstream of the squarer, because the third branch precompensates for frequency dependent distortion, is a differentiator 340. The differentiator 340 in FIG. 3 is sometimes referred to herein as a 90° phase slope equalizer because preferably it improves significantly on a conventional differentiator as described herein. Downstream of the differentiator 340 is another amplifier 342 and variable attenuator 344. Both the variable attenuators 334 and 344 are preferably impedance matched, and can be electronically controlled. In some embodiments one or the other or both of them can be fixed rather than variable. The third signal path 303 also preferably includes a signal pre-processor 346, the construction and purpose of which is described below. Again, the components downstream of the squarer 338 can be connected in a different sequence than that shown in the drawing, as long as signal integrity is maintained.

Differentiator Circuit—90° Phase Slope Equalizer

Figure 1:
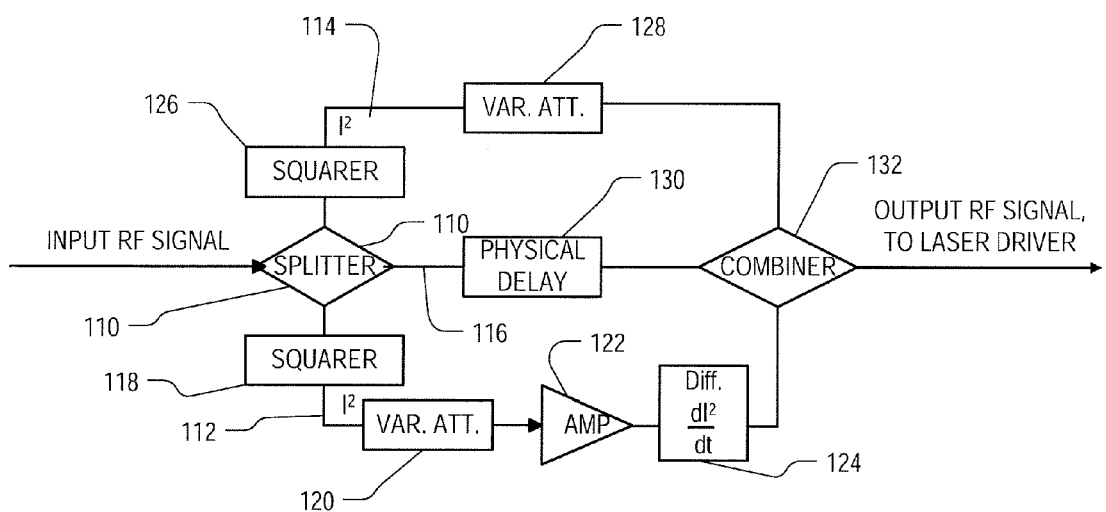
FIG. 1 is a block diagram of a conventional precompensation circuit.

Referring to the conventional approach illustrated in FIG. 1, one of its problems involves the differentiator 124. No specific differentiator circuit is shown or described in Kuo, nor is one taught in Gottwald. Pidgeon teaches only a classic RL differentiator such as that shown in FIG. 4. It comprises a series resistor followed by an inductance to ground, with the output being taken from the junction between the resistor and inductance. FIG. 5 illustrates another conventional RC differentiator, whose characteristic is identical to that of the RL differentiator of FIG. 4. It comprises a series capacitor followed by a resistor to ground, with the output being taken from the junction between the capacitor and resistor. Both conventional differentiation circuits have severely limited performance both because the magnitude and phase of their frequency response are far from desirable, and because their impedance is mismatched with preceding and subsequent circuit elements. The impedance mismatch can cause signal reflections which can undesirably degrade overall frequency response in both magnitude and phase.

As mentioned, the frequency dependent distortion term arises from second order distortion generated by fiber dispersion. This distortion can be express as:

$$I = jkLf(1+jCf), \quad (1)$$

where I=second order distortion in current, L=fiber length, f=frequency, k=constant, and C=constant.

For signal frequencies below 1000 MHz the second term in (1) is negligible. Equation (1) therefore indicates that for a fixed length of fiber the second order distortion magnitude introduced by fiber dispersion is linearly proportional to frequency and a constant 90° phase shift with respect to the carrier for all frequencies. Neglecting the second term of equation (1), the equation becomes:

$$I^2 = (jkLf)^2 \quad (2)$$

The differentiator must then convert the distortion signal power level in accordance with equation (2). The magnitude of transfer function in dB is then:

$$20 \log(I) = 20 \log(kLf) = 20 \log(f) + 20 \log(kL) \quad (3)$$

The combination of variable attenuator 120 and amplifier 122 can be set to handle the second term on the right side of the equation (3). The first term indicates that the differentiator frequency response must increase by 6 dB for each doubling of frequency f, so called "6 dB/Octave". 6 db/octave transfer functions are used in conventional RF/Microwave engineering, for example for filter stop-band attenuation. But for such applications the frequency bandwidth in which this frequency dependency is required is limited to only a portion of the total bandwidth in question. For the differentiator 124, the 6 db/octave response is required for the entire-pass band of the application.

The differentiator 124 contains delay and therefore cannot create a constant phase shift. However, as long as the phase shift is linear with its low frequency intercept being at 90° phase shift, the delay can be compensated elsewhere, such as by physical delay element 130. Therefore, the ideal phase shift provided by the differentiator in order to implement equation (3) should be a constant 90° phase shift for all frequencies after the delay adjustment.

Figure 6A:
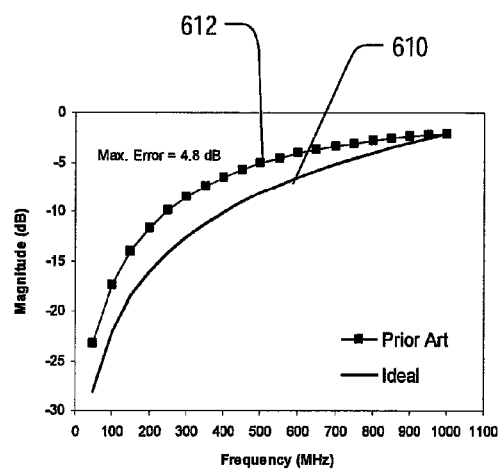
FIGS. 6(a) and 6(b) are magnitude and phase plots, respectively, comparing the desired response with that of the differentiator circuits of FIGS. 6(a) and 6(b).
Figure 6B:
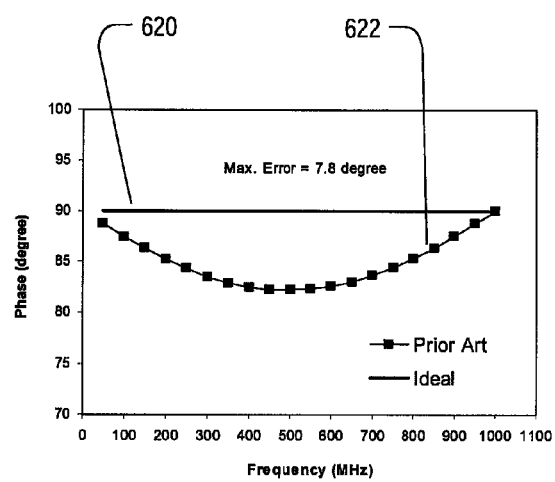

FIGS. 6(a) and 6(b) are plots illustrating the desired differentiator frequency response. FIG. 6(a) illustrates the desired magnitude frequency response (solid line 610), and FIG. 6(b) illustrates the desired phase frequency response (solid line 620). The linear portion of the phase response has been removed from the plot of FIG. 6(b) for clarity of illustration. As used herein, a phase shifter is said to introduce a "fixed phase", if the phase shift that it introduces is fixed after removal of any linear portion. Also shown in FIGS. 6(a) and 6(b) are the frequency response of a conventional differentiator. The magnitude of the frequency response of the conventional differentiator is illustrated as line 612 in FIG. 6(a), and the phase is illustrated as line 622 in FIG. 6(b). In this example, the conventional differentiator is a series capacitor with shunt resistor as shown in FIG. 5, with a capacitance of 1.5 pF and a resistance of 1000 Ohm. The insertion loss at 1000 MHz of the conventional differentiator is 2 dB. When the insertion loss at 1000 MHz is aligned with an desired curve, the error from desired is as large as 4.8 dB in magnitude and 7.8° in phase. This will severely limit the distortion cancellation required to meet end of line performance.

The magnitude and phase of the conventional differentiator circuit can be improved by decreasing the capacitance, but this results in excessive loss in the range of 10-15 dB. There are very undesirable consequences for this approach. In particular, additional amplification would be needed to compensate for the loss, which would result in increased circuit complexity. Additionally, the additional amplification would increase the noise interference and reduce the second order distortion signal beat signal to noise ratio, which in turn would degrade system carrier to noise ratio (CNR). Furthermore, the very small capacitance values that would be required are difficult to achieve in a commercial off-the-shelf part with low tolerance and high temperature stability. Still further, the resulting circuit still would be impedance mismatched, meaning that excessive reflection will interact with the circuit that precedes the differentiator and degrade the magnitude. Therefore, there is a need for a differentiator circuit for use in a precompensation circuit that performs much better than the conventional version.

Figure 7:
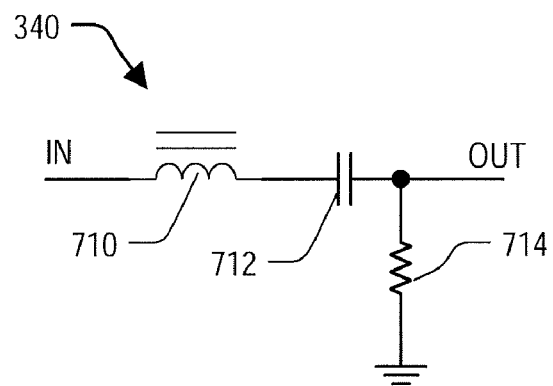
FIGS. 7, 8, 9(a) and 9(b) are schematic diagrams of differentiator circuits according to features of the invention.

FIG. 7 is a schematic diagram of a differentiator circuit 340 exhibiting improved performance. It comprises an inductance and a capacitance, in series combination between input node and output nodes, and an impedance connecting the output node to ground. The inductance is provided by an inductor 710, the capacitance is provided by capacitor 712, and the impedance is provided by resistor 714. As used herein, an "impedance" is a vector in the complex plane, and includes both pure resistances and pure reactances, as well as components and networks that have both resistance and reactance. "Reactance" is the imaginary part of an impedance vector. As used herein, where a reactance is called for, a non-zero reactance is implied unless stated otherwise. Similarly, "resistance" is the real part of an impedance vector. As used herein, where a resistance is called for, a non-zero resistance is implied unless stated otherwise. A "reactive component" is a component that has non-zero reactance; typically it is (or includes) an inductor and/or a capacitor. Similarly, a "resistive component" is a component that has non-zero resistance; typically it is (or includes) a resistor.

The circuit of FIG. 7 is similar to that of a conventional differentiator circuit in which the output is taken from the junction between a series capacitor and a shunt resistor, except that a series inductor has been added. The series inductor sacrifices some of the response at higher frequencies in favor of peaking the response curve close to (but still above) the high end of the frequency band in which the differentiator is designed to operate (50-1000 MHz). As such, a designer can choose component values for the circuit which result in a much closer match with the shape of the desired 6 dB/octave magnitude and fixed 90° phase shift curves, without having to resort to very small capacitances which push down the overall magnitude response.

Figure 8:
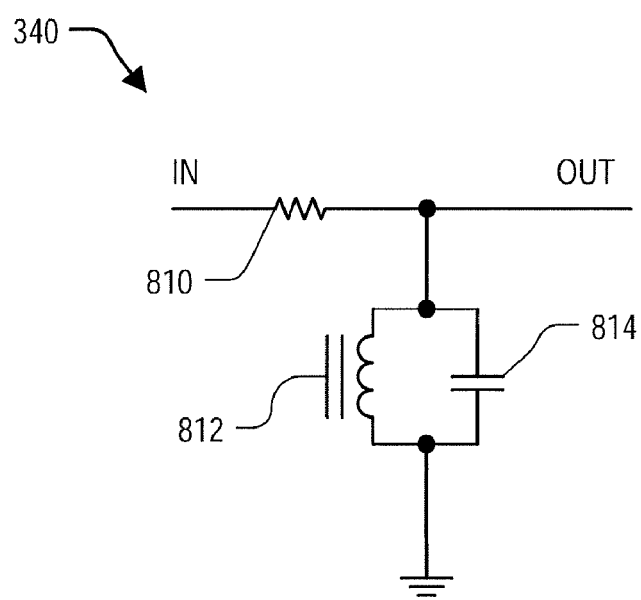

FIG. 8 is a dual of the circuit of FIG. 7 and has the same characteristics. It comprises a resistance 810 connected in series between the input and output nodes, and the parallel combination of an inductance 812 and a capacitance 814 connecting the output node to ground.

Figure 9A:
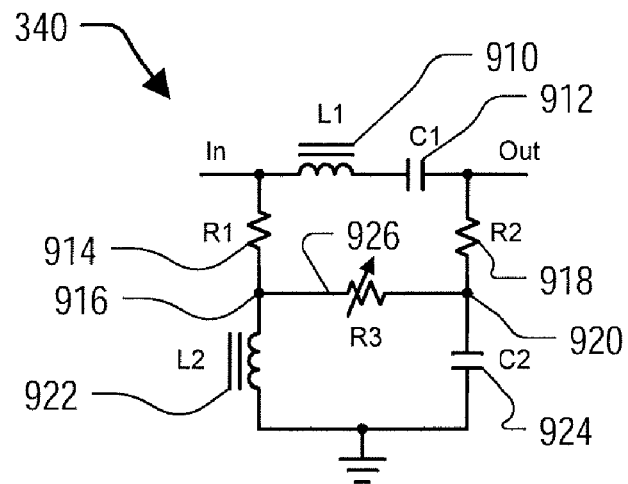

FIG. 9(a) is a schematic diagram of another differentiator circuit 340 exhibiting improved performance. This network is similar to that of FIG. 7, except that components have been added for the purpose if impedance matching the network to the impedance of the next downstream circuit (e.g. amplifier 342 in FIG. 3). The network of FIG. 9(a) comprises an inductor 910 and a capacitor 912, in series combination between input node and output nodes, an impedance (resistor 914) connecting the input node to a first common node 916, and an impedance (resistor 918) connecting the output node to a second common node 920. The first common node 916 is connected through an inductance (inductor 922) to ground, and the second common node 920 is connected through a capacitance (capacitor 924) to ground. In one embodiment, the two common nodes 916 and 920 are connected together; this configuration provides optimum impedance matching. In another embodiment, a variable impedance (variable resistor 926) connects the two common nodes together.

FIGS. 10(a) and 10(b) are magnitude and phase responses, respectively, of the network of FIG. 9(a) as compared to the ideal. The component values are chosen to provide the same −2 dB of loss at 1000 MHz as in the example of the conventional differentiator and as shown in FIG. 6(a). The resulting network has a magnitude response which differs by no more than 0.1 dB, throughout the predetermined frequency band of 50-1000 MHz, from the target magnitude response which increases at a rate of 6 dB/octave throughout the predetermined frequency band. This is a substantial improvement over the conventional differentiator. Although any error from the target magnitude response which is no more than 1 dB would be a significant improvement, the improvement afforded by the network of FIG. 9(a) is excellent. Similarly the maximum phase error as shown in FIG. 6(b) is only 2.7°. Again, this is a substantial improvement over the conventional differentiator, and although any phase error which is no more than 4° from the target fixed 90° phase shift would be a significant improvement, the improvement afforded by the network of FIG. 9(a) is excellent.

Figure 11:
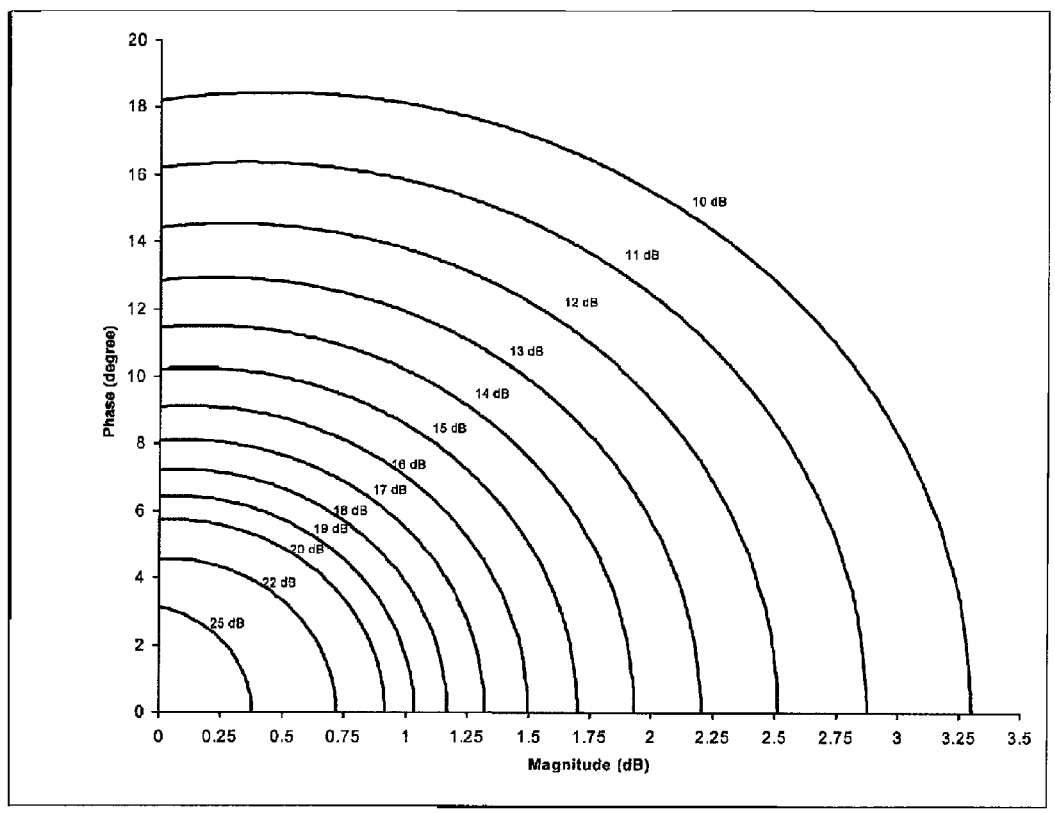
FIG. 11 is a vector cancellation diagram.

FIG. 11 is a vector cancellation diagram which can be used to evaluate the level of improvement in the resulting distortion cancellation obtained using differentiators achieving various levels of magnitude and phase compensation. The x-axis in FIG. 11 represents the magnitude error remaining after precompensation, and the y-axis represents the phase error remaining after precompensation. Each curve represents a measure of the overall level of distortion improvement resulting from a particular differentiator. For example, assume a conventional differentiator in which, if the 1000 MHz magnitude is aligned with the distortion generated by the dispersion, the predistortion signal at 500 MHz still has a 3.4 dB error in magnitude and 7.8° error in phase. Plotting this point on the chart of FIG. 11, it can be seen that this differentiator yields an overall distortion cancellation of less than 10 dB. It can be seen further from the chart that to achieve better distortion cancellation both the magnitude and phase error must be much smaller. For example, for 20 dB or better cancellation, the magnitude error must be less than 1 dB and phase error must be less than 6°. Moreover, a magnitude error of 1 dB will produce 20 dB distortion cancellation only if the phase error is 0, and a phase error of 6° will produce 20 dB distortion cancellation only if the magnitude error is 0.

As mentioned, the network of FIG. 9(a) can achieve a maximum magnitude error as low as 1 dB and a maximum phase error as low as 2.7°. It can be seen from FIG. 11 that the distortion cancellation of this circuit is better than 25 dB, as compare to the conventional differentiator with less than 10 dB. Furthermore, this is achieved with only a maximum of 2 dB loss throughout the frequency band of interest (occurring at 1000 MHz); although any loss which is no more than 4 dB while achieving the above would be a significant improvement.

As mentioned, the circuit of FIG. 9(a) is also impedance matched, which removes signal reflection interference. The perfect match occurs in an embodiment where common nodes 916 and 920 are connected together, or when variable resistor 926 reaches a value of zero in the embodiment shown in FIG. 9(a). In either embodiment, the following relationship also must hold in order to achieve the perfect match:

$$Z1 \times Z2 = Ro^2, \quad (4)$$

where Z1=impedance of inductor 910 and capacitor 912 in series, Z2=impedance of inductor 922 and capacitor 924 in parallel, and Ro=characteristic impedance of the circuit (normally 50Ω). Due to the impedance match characteristic of the circuit and multiple components, circuit components can be chosen to pre-emphasize the frequency response of certain frequency ranges to fine tune either magnitude or phase as desired while at the same time maintaining sufficient impedance matching.

In addition, the adjustment of variable resistor 926 in conjunction with appropriate selection of other component values in the circuit allows a broadband phase shift up to +/−5° to counter any parasitic phase shift within the predistortion circuit.

Figure 9B:
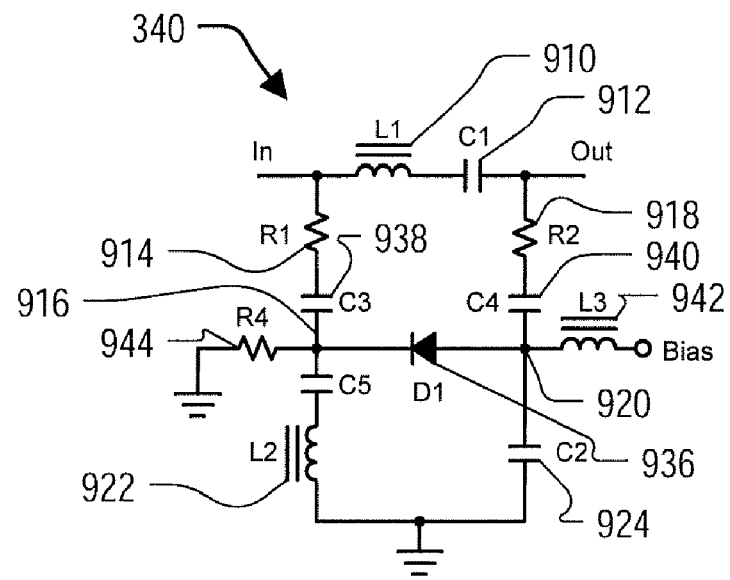

FIG. 9(b) is an electronically adjustable version of the network of FIG. 9(a). It is the same as that of FIG. 9(a) except that the variable resistor 926 in FIG. 9(a) has been replaced by a PIN diode 936, and the following additional components have been inserted in a known manner to provide isolation and bias: DC blocking capacitors 938, 940 and 942; and biasing inductor 942 and resistor 944.

Broadband Phase Shifter

Figure 12A:
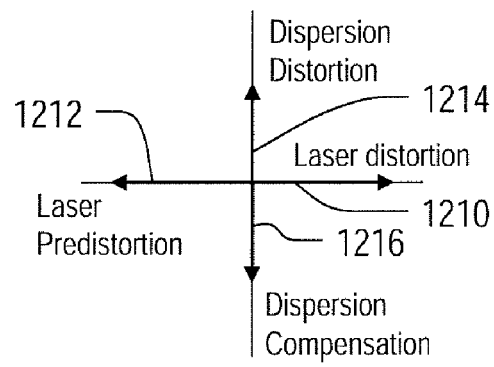
FIG. 12(a) is a vector diagram illustrating the canceling effect of laser distortion, frequency independent predistortion, fiber dispersion distortion, and frequency dependent predistortion.

FIG. 12(a) is a vector diagram illustrating four vectors: the distortion caused by the laser (vector 1210), the predistortion introduced by the frequency independent compensation path 114 (vector 1212), the distortion caused by dispersion in the fiber (vector 1214), and the predistortion introduced by the frequency dependent compensation path 112 (vector 1216). The laser distortion vector 1210 is 90° out of phase with the dispersion distortion vector 1214 for the reasons explained previously.

FIG. 12(a) illustrates the ideal situation, in which laser predistortion vector 1212 is equal and opposite to the laser distortion vector 1210, and the dispersion compensation vector 1216 is equal and opposite to the dispersion distortion vector 1214. It can be seen in FIG. 12(a) that laser predistortion vector 1212 has the same magnitude as laser distortion vector 1210, and they are of exactly opposite phase (vectors 1210 and 1212 lying at 0° and 180°, respectively, in the diagram). Similarly, it can be seen that dispersion distortion vector 1214 and dispersion compensation vector 1216 are of exactly opposite phase (vectors 1214 and 1216 lying at 90° and 270°, respectively, in the diagram). The sum of all the vectors is zero.

Figure 12B:
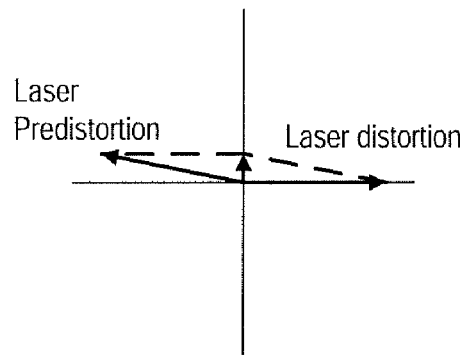
FIG. 12(b) illustrates what happens if a laser predistortion signal is slightly off the 180° position in one direction.

FIG. 12(b) illustrates what happens if, for example, the laser predistortion signal is slightly off the 180° position as shown in FIG. 12(b). It can be seen that the sum of the vectors leaves a residual distortion in the 90° position. This residual distortion will interact either additively or subtractively with dispersion and dispersion compensation distortion signals. On the other hand, FIG. 12(c) illustrates that if a circuit introduces a phase shift in the laser predistortion signal that is slightly off the 180° position in the opposite direction, then the residual distortion from such a circuit would be oriented in the 270° position, opposite from that in FIG. 12(b).

Figure 12C:
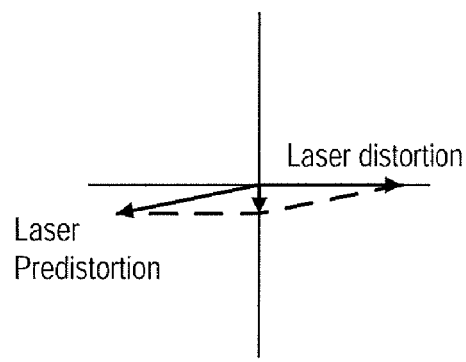
FIG. 12(c) illustrates what happens if a laser predistortion signal is slightly off the 180° position in the opposite direction.

In addition to the differentiator, various other circuit elements of the conventional circuit of FIG. 1 also contribute to the phase errors seen in FIGS. 12(b) and 12(c). For example, the signal splitter 110 and the combiner 132 (FIG. 1) both typically exhibit more loss at high frequencies, and the transformers and inductance that they conventionally include produce additional parasitic phase shifts. Because of these additional errors, the frequency independent path 114 of FIG. 1 should also include an amplitude equalizer in addition to variable attenuator 128. An amplitude equalizer can compensate the magnitude error with a great deal of accuracy over the frequency band, but it can also introduce excessive phase error which limits its ability to achieve over system requirement.

The error in FIGS. 12(b) and 12(c) can be compensated by inserting a broadband phase shifter into the frequency independent branch 114, which introduces a phase shift in the opposite direction. A phase shifter is difficult to design, however, especially for broadband applications such as that required for 50-1000 MHz channel loading. In particular, if not designed carefully, the phase shift circuit can cause excessive magnitude errors that can be even more detrimental than the phase error that it was designed to compensate. In addition to circuit parasitic phase shifts, the distortion generated by the laser and by fiber dispersion is never exactly out of phase with the predistortion signals.

It is difficult to design a broadband phase shifter that is able to introduce the required phase shift with as much flexibility as is required to exactly compensate the error of FIGS. 12(b) and 12(c). Phase shift circuits have been proposed in the past, such as those in U.S. Pat. Nos. 4,258,340, 4,581,595 and 5,365,187, all incorporated by reference herein. However, they have limited application in very broadband application as in 50-1000 MHz. Some also are unable to produce a 0° or negative phase shift, either of which may be required when correcting for laser and dispersion compensation interaction which can be complex. A more flexible broadband phase shifter is therefore required.

FIG. 13 is a schematic diagram of a broadband phase shifter 330 (FIG. 3) according to principles of the invention. It has an input port 1310 and an output port 1312. The input port is connected to the input of a splitter 1314 which may be a directional coupler or tapping device, providing the great majority of its signal power output to its straight-through output port 1316, and only a small amount of its signal power output to its tapping port 1318. Preferably at least three times the signal power level is provided to straight-through output port 1316 as is provided to tapping port 1318, for reasons which will become apparent below. (Stated equivalently, at least 75% of the input signal power is provided to the straight-through output port 1316 and at most 25% is provided to the tapping port 1318.) Even more preferably, 90% of the output power is provided to straight-through output port 1316 and only 10% is provided to tapping port 1318. The circuit includes a first signal path 1320 connecting the first output of the splitter to the first input of a combiner 1322, the output of which is connected to the output port 1312. The first signal path includes a delay element 1332 to match the signal delay in the second signal path, described next.

The circuit also includes a second signal path 1324 connecting the second output 1318 of the splitter 1314 to a second input of the combiner 1322. The second signal path 1324 includes in series combination an all-pass network 1326 and a variable attenuator 1328. The variable attenuator is preferably impedance-matched to that of the immediately downstream circuit element, which in the embodiment of FIG. 13 is the second input port of combiner 1322. The all-pass network is preferably constructed with a 3-port 90°/0° network which has an input port and two output ports 1328 and 1330. A 90°/0° all-pass network does not produce a 90° phase shift on either output relative to the input; rather, it produces output signals which differ from each other by 90°. Both output signals differ from the input signal by some additional fixed phase angle φ. Thus the signal on output port 1328 is phase shifted by φ+90° from the input signal, and the signal on output port 1328 is phase shifted by φ° from the input signal. The second output port 1330 is unused in the present circuit and is therefore terminated with a resistor to ground. The phase angle φ in one embodiment is approximately 45°. Preferably it is between 0° and 90°, and more preferably it is between 10° and 60°.

In one embodiment (not shown), the output 1328 of the all-pass network 1326 is connected directly to the variable attenuator 1328. FIG. 14(a) is a vector diagram illustrating the operation of such an embodiment. In this diagram, vector 1410 represents the signal arriving on the first input of combiner 1322. This signal has the same phase as the input signal at input node 1310 (FIG. 13), but its magnitude has been reduced by the proportion of the input signal power that was tapped off for the second signal path 1324. Vector 1412 represents the magnitude and phase of the signal arriving on the second input of combiner 1322. Its phase relative to the input signal phase is φ+90°, and its magnitude relative to the magnitude of vector 1410 is a function of both the setting of the variable attenuator 1328, and the proportion of input signal power tapped by the splitter 1314 into the second signal path 1324. Vector 1414 represents the signal output on output node 1312, after being combined with the signal from the first signal path 1320 in combiner 1322. Vector 1414 is the vector sum of vectors 1410 and 1412, and has a magnitude smaller than that of vector 1410 and an angle θ relative to the input signal that is between 0° and φ+90°. The magnitude reduction can be compensated by an amplifier and variable attenuator elsewhere in the signal path, for example by amplifier 332 and variable attenuator 334 (FIG. 3).

It can be seen that by varying variable attenuator 1328, any desired phase shift θ which is between 0° and φ+90°, can be inserted into the signal as it passes through broadband phase shifter 330. The minimum phase shift is achieved when variable attenuator 1328 is set at its maximum value, and since no attenuator has infinite impedance, in actuality the minimum phase shift must be slightly more than 0°. It can be made exactly 0°, however, if the variable attenuator 1328 has an "off" (disconnected) position. Also, the maximum phase shift is achieved when the variable attenuator 1328 is set at its minimum value, typically 0Ω. But the maximum phase shift is also limited by the tapping ratio in splitter 1314, which limits the maximum length of vector 1412. For an example tapping ratio of 25%/75% in splitter 1314, and an example phase offset $\phi=45°$ introduced by the all-pass network 1326, the maximum phase shift achievable by the embodiment of FIG. 13 in which the output 1328 of the all-pass network 1326 is connected directly to the variable attenuator 1328, is approximately 12.1°.

It might be assumed that it would be best to tap as much of the input signal as possible for the second signal path 1324, in order to provide the widest range of phase shift adjustability. There are at least two tradeoffs to doing so, however. First, a small tapping ratio permits the maximum setting of attenuator 1328 to produce an overall phase shift that is very close to 0°, which is sometimes required. Second, it can be appreciated that even with the best components, the signal degrades slightly through the various components in the second signal path 1324. By minimizing the proportion of input signal power that traverses signal path 1324, the amount of signal degradation from this source is also minimized.

A drawback to the embodiment in which the output 1328 of the all-pass network 1326 is connected directly to the variable attenuator 1328, is that as can be seen from FIG. 14(a), only positive phase shifts are achievable. This is a shortcoming because it limits the range of control for laser and dispersion compensation interaction which can be complex and may require a negative phase shift. As shown in FIG. 13, in another embodiment, instead of connecting the output 1328 of the all-pass network 1326 directly to the variable attenuator 1328, it is connected through a selective phase inverter 1334. The selective phase inverter 1334 can be controlled to either pass the signal through with no additional phase shift, or to pass it through inverted (i.e. shifted by 180°). FIG. 14(b) is a vector diagram similar to that of FIG. 14(a), illustrating the operation of the FIG. 13 embodiment in the situation where the selective phase inverter is set to invert the signal phase. As can be seen, the phase of the signal 1416 arriving on the second input of combiner 1322, relative to the input signal phase, is now $\phi+270°$, and the output signal vector 1418 now has a phase $\theta$ relative to the input signal which is negative. The magnitude of the output vector 1418 in this case is larger than that of the vector 1410, but again, the magnitude change can be compensated by an amplifier and variable attenuator elsewhere in the signal path. With an example tapping ratio of 10%/90% in splitter 1314, and an example phase offset $\phi=45°$ introduced by the all-pass network 1326, the phase shift achievable by the embodiment of FIG. 13 including the selective phase inverter 1334 is approximately from $\theta=-3.8°$ to $\theta=+4.4°$.

As shown in FIG. 13, the selective phase inverter preferably includes an input switch 1336 connecting the input node of the selective phase inverter to select a first or a second throw terminal, and an output switch 1338 connecting selectively a first or a second throw terminal to the output node of the selective phase inverter. A 180° phase shifter 1340 is connected between the first throw terminal of the input switch 1336 and the first throw terminal of the output switch 1338, and a 0° phase shifter 1342 is connected between the second throw terminal of the input switch and the second throw terminal of the output switch 1338. The input and output switches 1338 and 1338 are operated in common such that either both switches connect to their respective first throw terminals or both switches connect to their respective second throw terminals. The switches are not operated with one switch connected to its first throw terminal while the other switch is connected to its second throw terminal.

The 180° phase shifter 1340 comprises a magnetic core transformer having first and second windings. The first winding has one terminal connected to the first throw terminal of the input switch 1336 and its second terminal grounded, and the second winding has one terminal connected to the first throw terminal of the output switch 1338 and the second terminal grounded. The connections are such as to reverse the signal polarity as it passes through the transformer. The 0° phase shifter 1342 can be simply one winding of a transformer having the same delay and loss characteristics as transformer 1340 (the other winding having both its terminals grounded), such that switching between the two throw terminal sets does not impact the total delay or loss characteristics in the second path 1324. Alternatively, the 0° phase shifter 1342 can have different delay and loss characteristics than that of the transformer 1340, (such as by consisting of merely a wire), if an appropriate adjustments are made elsewhere in the circuit in coordination with selection made in the input and out switches 1336 and 1338.

As with other linear series-connected components in various branches of the circuits illustrated herein, it will be appreciated that the all-pass network 1326, selective phase inverter 1334, and variable attenuator 1328, all can be connected in a different sequence than that shown in the drawings so long as signal integrity is maintained. The selective phase inverter 1334 even can be connected upstream of the all-pass network 1326.

Composite Second Order Distortion Minimization

As mentioned, the kind of distortion generated in the fiber due to dispersion is second order distortion. In a multi-channel application such as CATV, the second order distortion is manifested as a composite second order (CSO) distortion where the second order distortion from multiple channels fall on the same frequency point. In North America, which uses the NTSC channel plan, the typical analog video CSO distortion peaks occur at 1.25 MHz below and above the video subcarrier. The one below the video subcarrier is caused by the frequency difference between two subcarriers, or so called f2−f1 type CSO; whereas the one above is due to frequency summation of two subcarriers, or called f2+f1 type CSO.

The second-order distortion generator followed by the differentiator as described in Kuo is only an approximation of the second order distortion generated in the fiber. The implementation is simple and, with the modifications described herein, would be effective for short fiber distances and low numbers of channels. However, when the distance is longer and the number of video channels is much larger, the simple second order distortion generator followed by a differentiator is insufficient. Much more second order distortion suppression is desired in order to further improve system performance. In particular, whereas the basic circuit implementation usually minimizes f2+f1 type CSO, it is found that incomplete cancellation is still observed in f2−f1 type CSO. The problem appears to result from a phase mismatch between the predistortion circuit and the dispersion in the fiber. Whereas for f2+f1 type CSO, the compositing distortion signals are approximately 180° out of phase with each other, for f2−f1 type CSO the phase difference appears to be more on the order of 120°. Consequently, the cancellation is incomplete.

Because the f2−f1 type CSO peaks are only 2.5 MHz apart from the f2+f1 type CSO peaks (in the NTSC channel plan), and there can be as many as 80 channels represented in the RF modulation signal, it is practically impossible to design a phase equalizer which corrects the phase errors for f2−f1 type CSO peaks without at the same time introducing new errors in the f2+f1 type CSO peaks. The problem is especially pronounced in middle frequencies of the band, where frequency mixing from both high and low subcarriers combine. In addition, it has been observed that for f2+f1 type CSO, the subcarriers originating the distortion peak are both below the frequency of the peak, whereas for f2−f1 type CSO, especially in the middle frequencies of the band, one of the subcarriers originating the distortion peak is above the frequency of the peak and the other is below the frequency of the peak.

In an aspect of the present invention, therefore, a preprocessing filter 346 is series connected upstream of the squarer 338 in the dispersion precompensation path 303 of precompensation unit 212. Filter 346 is designed to have a magnitude response which somewhat attenuates the higher and lower ends of the frequency band of interest, to a greater extent than it attenuates the frequencies in the middle of the band. Preferably the transfer characteristic of filter 346 has a magnitude curve which peaks within the frequency band, and slopes down monotonically from the peak toward both ends of the frequency band.

Figure 15:
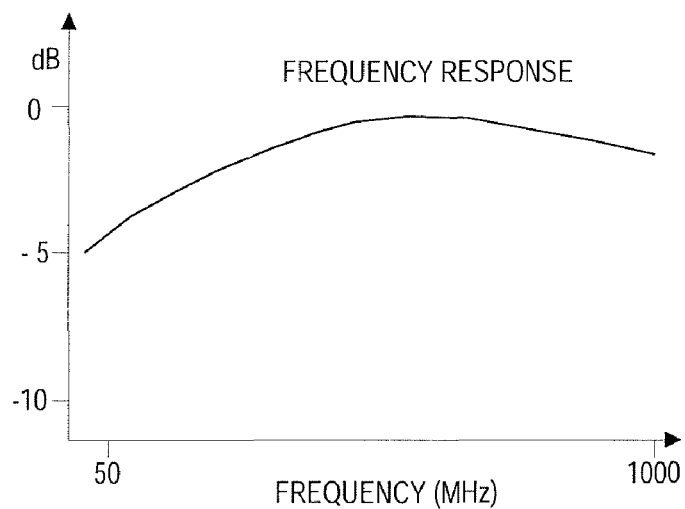
FIG. 15 illustrates the desired frequency response of the preprocessor of FIG. 3.

FIG. 15 illustrates the desired frequency response of the preprocessor 346. As can be seen, it attenuates the higher and lower frequencies of the band more severely than the mid-range frequencies. In addition, it can be seen that the response curve of FIG. 15 has no inflexion points, and that the attenuation at the highest frequency of the band (at 1000 MHz) is weaker than the attenuation at the lowest frequency of the band (at 50 MHz). Such selective alteration of the carrier amplitudes in unequal fashion generates unequal second order distortion magnitudes after the squarer, and results in an altered and improved f2−f1 type CSO in the middle frequencies of the band.

Figure 16:
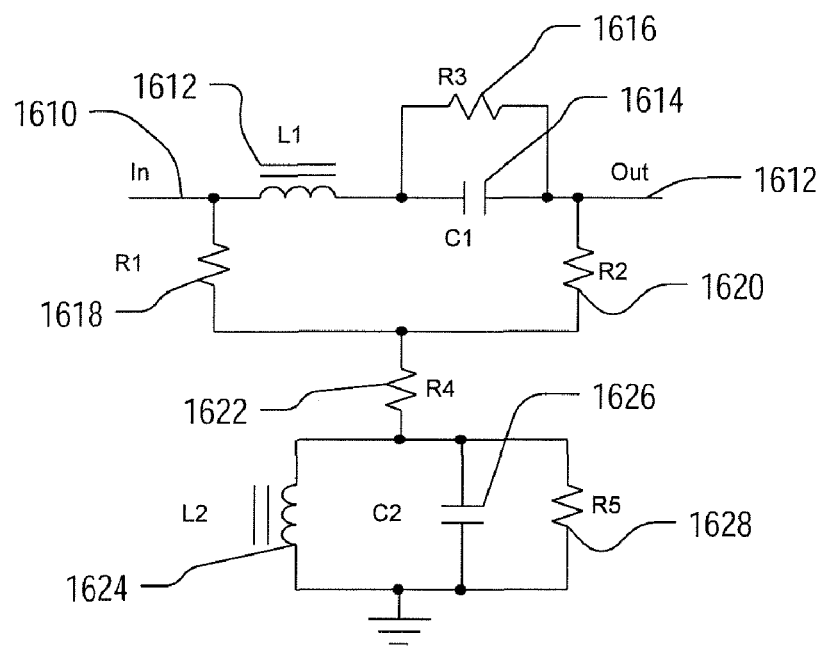
FIG. 16 is a circuit schematic of the preprocessor of FIG. 3.

FIG. 16 is a circuit schematic of a filter that can generate the response shown in FIG. 15. The filter is preferably impedance-matched, and this is the case with the circuit of FIG. 15. In series combination between an input node 1610 and an output node 1612, the circuit comprises an inductance 1612 and, in parallel combination, a capacitance 1614 and a resistance 1616. The circuit further has resistances 1618 and 1620 series connected between the input and output nodes 1610 and 1612. The junction between the resistances 1618 and 1620 is further connected to ground via the series combination of a resistance 1622 and an RLC network consisting of the parallel combination of an inductance 1624, a capacitance 1626, and a resistor 1628. It is within the skill of the reader to calculate values for the individual components in FIG. 16 to yield a filter having the magnitude response characterized in FIG. 15. Other circuit topologies are possible as well, as will be appreciated by the reader.

Additional Enhancements

As mentioned, the second term of equation (1) above is negligible for frequencies below 1000 MHz. However, for higher frequencies, such as up to a few GHz, the second term can be significant after the 20 to 30 dB of improvement has been achieved. To further improve the performance when the frequency bandwidth includes such high frequencies, additional processing of a 180° phase shifted version of the input signal can be added.

Figure 17:
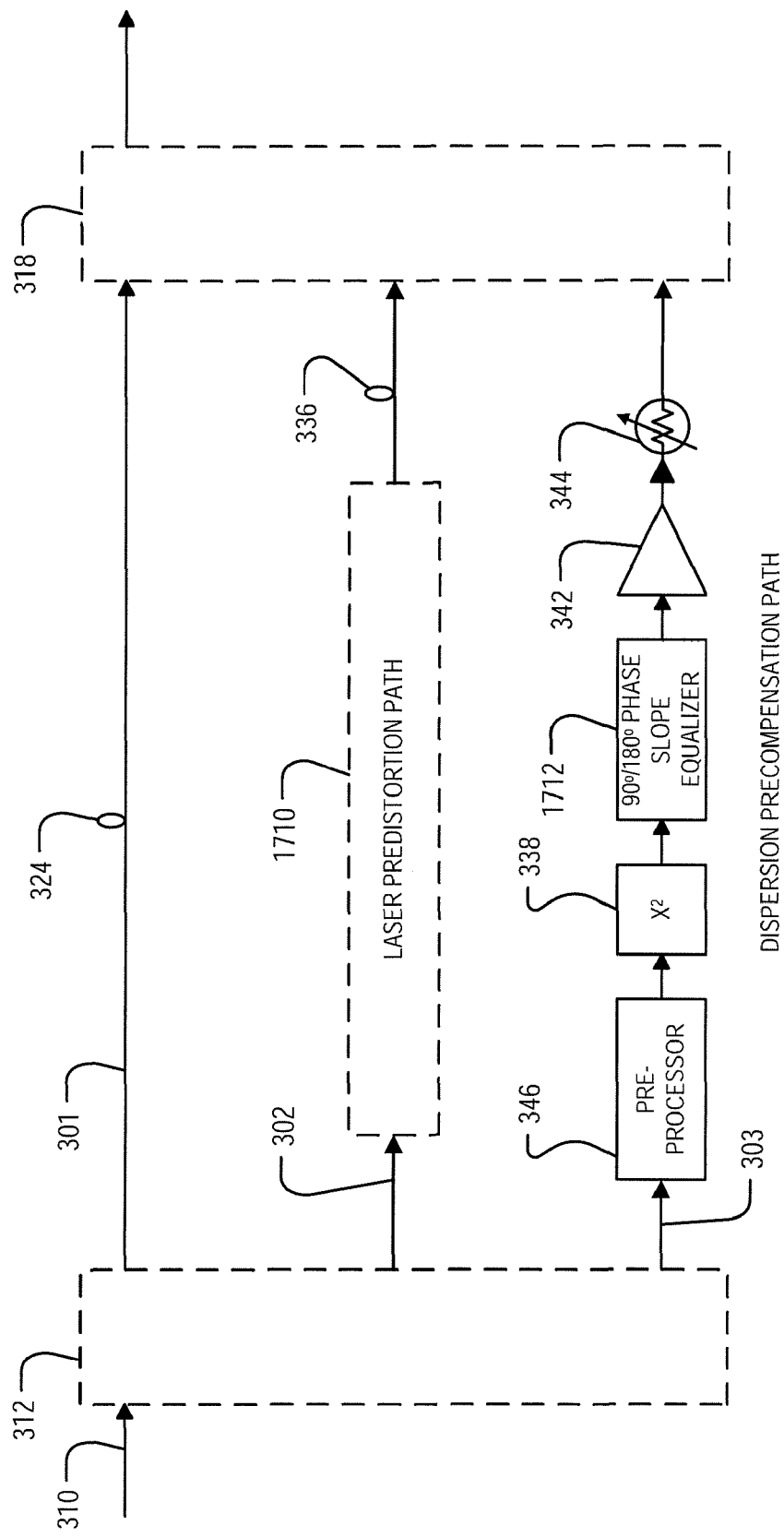
FIG. 17 is a block diagram of the precompensation unit according to features of the invention.

FIG. 17 is a block diagram of the precompensation unit 212 which is similar to that of FIG. 3, but modified to include 180° phase slope processing. The details within the splitter 312, combiner 318 and laser predistortion path 302 have been omitted from FIG. 17 for clarity of illustration. In addition, the 90° phase slope equalizer 340 has been replaced by a 90°/180° phase slope equalizer 1712. The 90°/180° phase slope equalizer 1712 allows adjustment to both a 90° phase shifted version of the input signal as well as to a 180° phase shifted version of the input signal. In particular, it provides one predetermined magnitude function of frequency and substantially 90° phase shift, and a second predetermined magnitude function of the frequency squared and substantially 180° phase shift.

Figure 18:
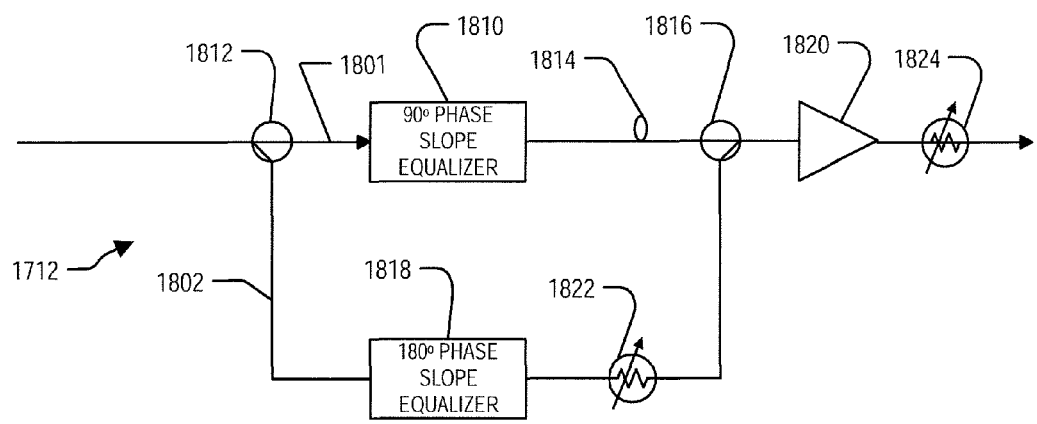
FIGS. 18 and 19 are schematic diagrams of alternative embodiments of the 90°/180° phase slope equalizer in FIG. 17.

FIG. 18 is a schematic diagram of one embodiment of the 90°/180° phase slope equalizer 1712. This implementation places the 90° phase processing and the 180° phase processing into parallel signal sub-paths, so the dispersion described in the first and second terms of equation (1) can be compensated independently of each other.

The circuit of FIG. 18 comprises a splitter 1812 having an input and first and second outputs, a combiner 1816 having first and second inputs and an output, a first signal sub-path 1801 connecting the first output of the splitter 1812 to the first input of the combiner 1816, and a second signal sub-path 1802 connecting the second output of the splitter 1812 to the second input of the combiner 1816. An amplifier 1820 and variable attenuator 1824 are also connected serially in the dispersion precompensation path 303. The first signal sub-path 1801 includes a 90° phase slope equalizer 1810 which may be the same as the 90° phase slope equalizer 340 in FIG. 3, and the second signal sub-path 1802 includes a 180° phase slope equalizer. The 180° phase slope equalizer has a phase response which approximates a target fixed phase shift of 180° throughout the desired frequency band. The target magnitude response of the 180 phase slope equalizer can be derived from equation (1) with the inclusion of the second term.

Figure 19:
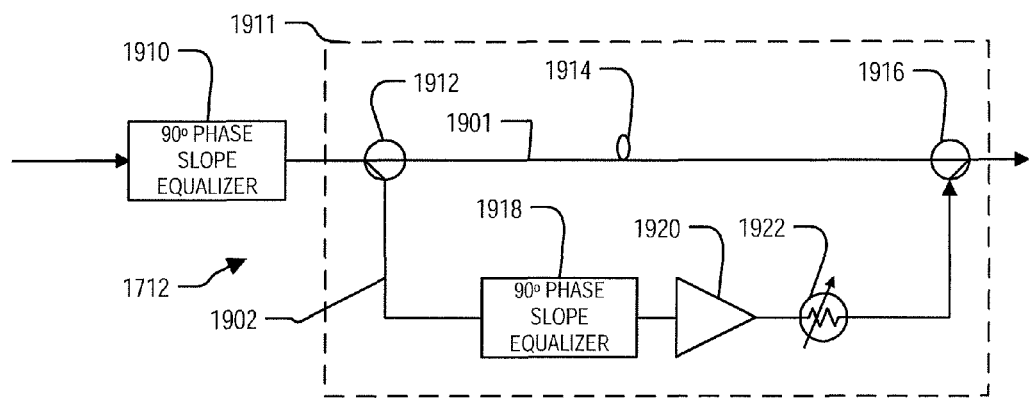

FIG. 19 is a schematic diagram of another embodiment of the 90°/180° phase slope equalizer 1712. It comprises a 90° phase slope equalizer 1910 series connected with a 180° processing block 1911. The 90° phase slope equalizer 1910 can be the same as the 90° phase slope equalizer 340 in FIG. 3. The 180° processing block 1911 comprises a splitter 1912 having an input and first and second outputs, a combiner 1916 having first and second inputs and an output, a first signal sub-path 1901 connecting the first output of the splitter 1912 to the first input of the combiner 1916, and a second signal sub-path 1902 connecting the second output of the splitter 1912 to the second input of the combiner 1916. The second signal sub-path 1902 includes a second 90° phase slope equalizer 1918. One of the signal sub-paths 1901 and 1902 includes a delay matching element 1914 (signal sub-path 1901 in the embodiment of FIG. 19), and one of the signal sub-paths 1901 and 1902 includes an amplifier 1920 and a variable attenuator 1922 (signal sub-path 1902 in the embodiment of FIG. 19).

Since the second 90° phase slope equalizer 1918 is series-connected with the first 90° phase slope equalizer, it rotates the signal phase by another 90° so that its magnitude function operates on a 180° phase shifted version of the input signal. The magnitude response of the second 90° phase slope equalizer 1918 is not determinable independently from that of the 90° phase slope equalizer 1910, since the transfer function of the 90° phase slope equalizer 1910 will affect the transfer function required for 90° phase slope equalizer 1918. However, it is easily calculated given the targets set forth above for 90° phase slope equalizer 1810 and 180° phase slope equalizer 1818 (FIG. 18).

While the invention is disclosed herein by reference to preferred embodiments and examples detailed above, it is to be understood that these examples are intended in an illustrative rather than in a limiting sense. It is contemplated that modifications and combinations will readily occur to those skilled in the art. As one example, many of the functional modules shown in the various signal paths in drawings herein can be connected in a different sequence than that shown, without affecting their function. Some can also be moved from a common section of a signal path into the branches of a branched section of the signal path, or vice-versa. Some modules can be re-arranged from one branch to another branch or branches of a branched section of a signal path. Modifications and combinations such as these will be apparent to the reader and are within the spirit of the invention and the scope of the following claims. In addition, while each of the inventive aspects discussed herein provide benefit by themselves, the greatest improvement is achieved when some or especially all of them are used together.

What is claimed is:

1. A phase shifter comprising:
    an input port for receiving an input electronic signal;
    a splitter having an input connected to the input port and having first and second electronic outputs, the splitter delivering at least three times the signal power level to the first output as it delivers to the second output;
    a combiner having first and second inputs and further having an output for carrying a phase shifted version of the input signal;
    a first signal path connecting the first output of the splitter to the first input of the combiner; and
    a second signal path connecting the second output of the splitter to the second input of the combiner, the second signal path including an electronic variable attenuator and an electronic all-pass network having an input and a first output, the input and first output of the all-pass network being connected in series combination with the variable attenuator, wherein the all-pass network provides on its first output a version of the signal on its input which is shifted in phase by a phase angle $\phi+90°$, where $0<\phi<90°$.

2. A phase shifter according to claim 1, wherein the first signal path includes a fixed time delay element.

3. A phase shifter according to claim 1, wherein the all-pass network further has a second output on which the all-pass network provides a version of the signal on its input which is shifted in phase by phase angle $\phi$,
    and wherein the second output of the all-pass network is terminated.

4. A phase shifter according to claim 1, wherein the variable attenuator is an impedance matched network.

5. A phase shifter according to claim 1, further comprising a selective phase inverter connected serially in the second signal path.

6. A phase shifter according to claim 5, wherein the selective phase inverter comprises:
    an input node and an output node connected in series combination with the variable attenuator and the all-pass network;
    an input switch connecting the input node of the selective phase inverter to selectively a first or a second throw terminal;
    an output switch connecting selectively a first or a second throw terminal to the output node of the selective phase inverter;
    a 180° phase shifter connected between the first throw terminal of the input switch and the first throw terminal of the output switch; and
    a 0° phase shifter connected between the second throw terminal of the input switch and the second throw terminal of the output switch, the input and output switches being operated in common such that either both switches connect to their respective first throw terminals or both switches connect to their respective second throw terminals, and such that the switches are not operated with one switch connected to its first throw while the other switch is connected to its second throw.

* * * * *